United States Patent
Furukawa et al.

[11] Patent Number: 5,717,672
[45] Date of Patent: Feb. 10, 1998

[54] SPINDLE SERVO APPARATUS FOR OPTICAL DISK PLAYER

[75] Inventors: Junichi Furukawa; Kiyoshi Tateishi, both of Tsurugashima, Japan

[73] Assignee: Pioneer Electronic Corporation, Tokyo, Japan

[21] Appl. No.: 670,637

[22] Filed: Jun. 26, 1996

[30] Foreign Application Priority Data

Jul. 7, 1995 [JP] Japan .................. 7-172278

[51] Int. Cl.⁶ .................. G11B 15/52
[52] U.S. Cl. .................. 369/50; 369/44.29
[58] Field of Search .................. 369/50, 54, 44.28, 369/44.29, 47, 48

[56] References Cited

U.S. PATENT DOCUMENTS 4,611,319  9/1986  Naito .................. 369/50 X
5,629,924  5/1997  Yokogawa .................. 369/275.3

Primary Examiner—Thang V. Tran
Attorney, Agent, or Firm—Sughrue, Mion, Zinn, Macpeak & Seas, PLLC

[57] ABSTRACT

A spindle servo apparatus for an optical disk player, which detects a maximum inversion interval or a maximum period from a read signal acquired from an optical disk by pickup means, compares the detected maximum inversion interval or maximum period with a reference value, and drives a spindle motor in accordance with the comparison result. When a tracking servo apparatus is inactive, the spindle servo apparatus sets the reference value greater than the one set when the tracking servo apparatus is active. It is therefore possible to cope with the case where the maximum inversion interval or maximum period which is detected from the read signal is erroneously determined longer than the actual length.

2 Claims, 2 Drawing Sheets

SPINDLE SERVO APPARATUS FOR OPTICAL DISK PLAYER

BACKGROUND OF THE INVENTION

1. Field of the Invention

The present invention relates to a spindle servo apparatus for controlling the rotational speed of a spindle motor in a disk player, and, more particularly, to a spindle servo apparatus for performing coarse adjustment of the spindle rotational speed.

2. Description of the Related Art

In a player which reproduces recorded data from an optical disk such as a CD (Compact Disk) where digital data is recorded, the rotational speed of a spindle motor for rotating an optical disk is controlled by spindle servo so that the rotational speed of an optical disk becomes a specified speed (which ensures a constant linear speed in the case of CD's). Normally, the spindle servo converts a read signal acquired from an optical disk by a pickup to a binary signal of "1" or "0", detects the maximum period or the maximum inversion interval (which is the pit portion containing a sync signal and is called "maximum run length") of the binary signal and performs coarse adjustment to drive the spindle motor in such a way that the maximum period or the maximum inversion interval is equal to a predetermined reference value. When the maximum inversion interval or the maximum period becomes equal to the reference value and the coarse adjustment is accomplished, then a fine adjustment is executed by extracting the sync signal recorded on the optical disk to be subjected to phase comparison with a reference oscillation signal, and by driving the spindle motor in accordance with the comparison result.

However, in the spindle servo for the coarse adjustment, when the tracking servo apparatus is not working for the tracking servo loop to open for a searching operation for example, the reading position by the pickup or the position of a beam spot on the optical disk is shifted from the center of a pit train before reading position reaches the target track. In this case, the read signal is affected by mirror portions between pit trains on the disk. Accordingly, the maximum period or the maximum inversion interval would be detected longer than the actual length, so that a control system would determine the rotational speed of the spindle motor as being low. Consequently, the control system works so as to increase the rotational speed of the spindle motor, thus making the rotational speed of the optical disk unstable.

SUMMARY OF THE INVENTION

Accordingly, it is an objective of the present invention to provide a spindle servo apparatus which can properly perform coarse adjustment of the rotational speed of the spindle motor even when the tracking servo loop is open.

According to this invention, there is provided a spindle servo apparatus for an optical disk player, which reads and reproduces data recorded on an optical disk, for performing coarse adjustment to set a rotational speed of a spindle motor for rotating an optical disk to a specified speed, which apparatus comprises: pickup means for irradiating a light beam on a recording surface of the optical disk, receiving reflected light therefrom and producing a read signal corresponding to the amount of received light; means for detecting a maximum inversion interval or a maximum period of the read signal; reference value generating means for generating a reference value; comparison means for comparing the maximum inversion duration or maximum period with the reference value; and driving means for driving the spindle motor in accordance with the comparison result, wherein when a tracking servo apparatus is inactive to control an irradiation position of the light beam on the optical disk by the pickup means, the reference value generating means generates the reference value greater than that in the case where the tracking servo apparatus is active.

According to the spindle servo apparatus for an optical disk player, which has the above structure, the maximum inversion interval or maximum period that is detected from the read signal acquired from an optical disk by the pickup means is compared with the reference value, and the spindle motor is driven in accordance with the comparison result. When the tracking servo apparatus is inactive, the reference value is set greater than the one set when the tracking servo apparatus is active. It is therefore possible to cope with the case where the maximum inversion interval or maximum period which is detected from the read signal is erroneously determined longer than the actual length.

DETAILED DESCRIPTION OF THE PREFERRED EMBODIMENT

A preferred embodiment of the present invention will now be described in detail with reference to the accompanying drawings.

Figure 1:
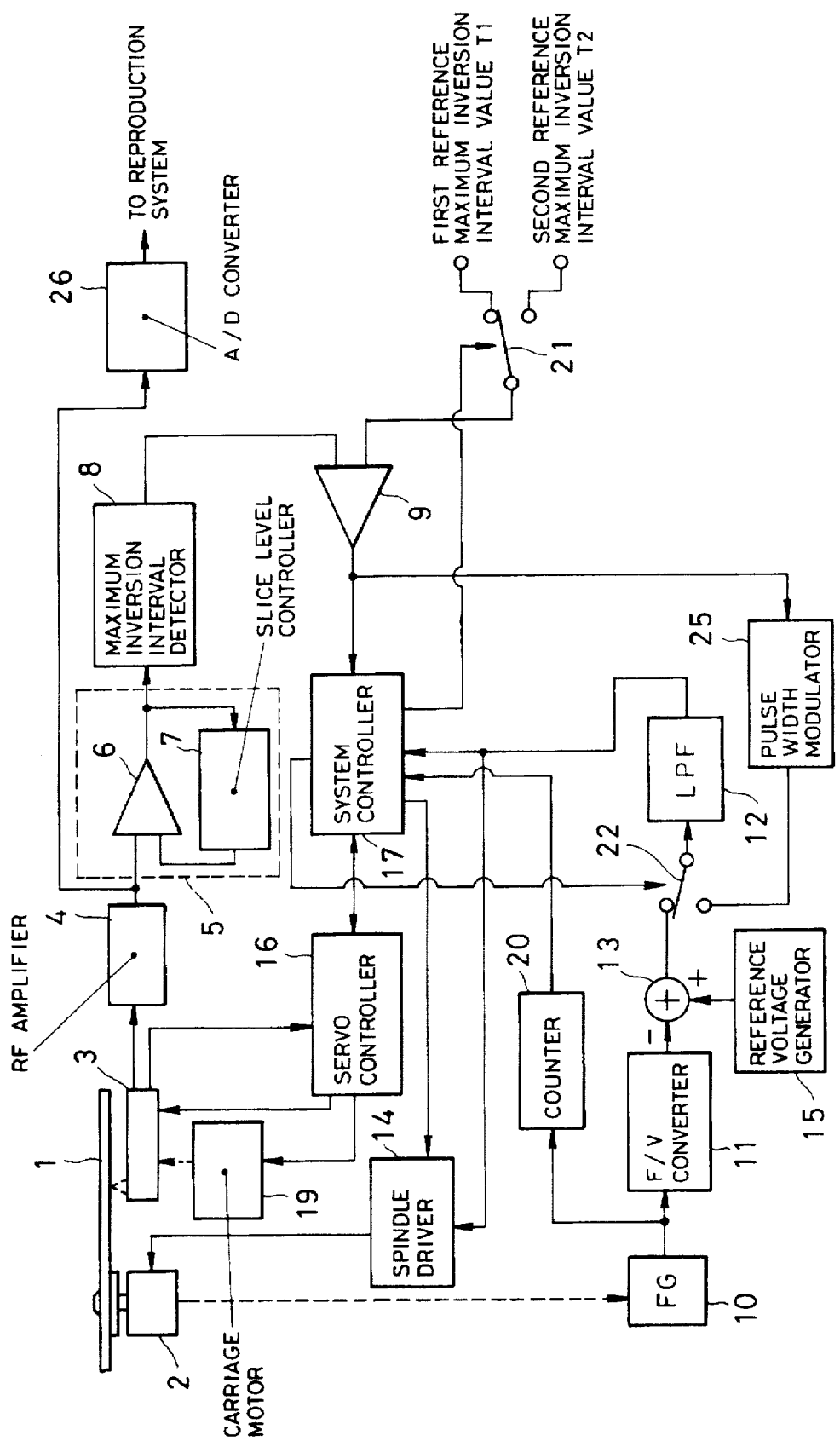
FIG. 1 is a block diagram illustrating one embodiment of the present invention.

FIG. 1 shows an optical disk player to which a spindle servo apparatus embodying this invention is adapted. An optical disk 1 to be set in this optical disk player is a CLV (Constant Linear Velocity) type disk which has information signals recorded at a constant linear speed, and is rotated by a spindle motor 2. Digital data recorded on the optical disk 1 is optically read by a pickup 3 which radiates a light beam and receives light reflected from the optical disk 1. A read signal or an RF (Radio Frequency) signal which is output from the pickup 3 is an analog signal indicative of the received amount of light reflected from the optical disk 1. This read signal is amplified in an RF amplifier 4 and the amplified signal is then converted to a binary signal in a binary circuit 5. The output signal of the RF amplifier 4 is digitized in an A/D converter 26, and the resultant digital signal is supplied to a signal reproduction system.

The binary circuit 5 comprises a comparator 6 and a slice level controller 7 which sets a slice level. The comparator 6 compares the output level of the RF amplifier 4 with the set slice level as a threshold value. The slice level controller 7 controls the slice level in such a manner that the DC level of the output signal of the comparator 6 becomes 0.

A maximum inversion interval detector 8 is connected to the output of the binary circuit 5. The maximum inversion interval detector 8 individually measures the interval from a leading point of the output signal of the binary circuit 5 to the next trailing point and the interval from a trailing point of that output signal to the next leading point by counting clock pulses using a counter, and outputs the maximum value of the measured intervals as the maximum inversion interval. The output value of the maximum inversion interval detector 8 is supplied to one input of a comparator 9 whose other input is connected to a changeover switch 21.

This switch 21 selectively relays one of a first reference maximum inversion interval value T1 for an open tracking loop and a second reference maximum inversion interval value T2 for a closed tracking loop to the other input of the comparator 9 in accordance with an instruction from the system controller 17. When the maximum run length (which is provided to sync pits) of the optical disk 1 is 16T (T: unit bit interval), for example, the second reference maximum inversion interval value T2 is 16T and the first reference maximum inversion interval value T1 is 20T. The comparator 9 produces an 8-bit differential output as the comparison result, which is supplied to the system controller 17 and a pulse width modulator 25. The pulse width modulator 25 produces an output whose pulse width corresponds to the 8-bit differential output every given period. The output pulse of the pulse width modulator 25 is supplied to a changeover switch 22.

The spindle motor 2 is provided with an FG (Frequency Generator) 10 which generates an AC signal whose frequency corresponds to the rotation of the spindle motor 2. The AC signal from the FG 10 is converted to a DC voltage in an F/V (Frequency/Voltage) converter 11. The output voltage of the F/V converter 11 is supplied to a subtracter 13 which receives a reference voltage corresponding to a reference rotational speed from a reference voltage generator 15. The voltage difference between the reference voltage and an output voltage of an LPF (Low-Pass Filter) 12 is supplied to the changeover switch 22 from the subtracter 13. The switch 22 selectively relays one of the voltage difference from the subtracter 13 and the output pulse of the pulse width modulator 25 to the LPF 12 in accordance with an instruction from the system controller 17. The output signal of the LPF 12 is supplied to the system controller 17 and a spindle driver 14. The spindle driver 14 drives the spindle motor 2 so as to cancel the voltage from the LPF 12.

A servo controller 16 is connected to the output of the pickup 3. The servo controller 16 responds to an instruction from the system controller 17, constituted of a microcomputer, to execute individual servo controls, namely tracking servo, focus servo and carriage servo, through the servo controller 16 in accordance with a servo signal acquired from the received light signal from the pickup 3. The pickup 3 is designed to be movable in the radial direction of the optical disk by a carriage motor 19 in the carriage servo system. The system controller 17 is provided to perform all control operations of the optical disk player. One of the control operations of the system controller 17 is to receive the output signals of the comparator 9 and the subtracter 13, and the controller 17 performs an operation according to those signals.

After the optical disk 1 is set on the turn table (not shown) of the player, the system controller 17 moves the reading position by the pickup 3 to a predetermined position like the innermost track on the optical disk 1 in response to a detection output from an unillustrated disk detection means. More specifically, the system controller 17 drives the carriage motor 19 to move the pickup 3 to the predetermined position. After the movement of the pickup 3, the system controller 17 issues an instruction to the servo controller 16 to enable the focus servo system and tracking servo system and instructs the spindle driver 14 to drive the spindle motor 2. At this time, as the spindle motor 2 rotates, the FG 10 generates an AC signal with a frequency according to the rotation. This AC signal is a pulse signal and is converted in the F/V converter 11 to a DC voltage which is supplied to the subtracter 13. The subtracter 13 produces a differential voltage between the DC voltage from the F/V converter 11 and a reference voltage corresponding to a reference rotational speed $N_{ref}$ from the reference voltage generator 15. The differential voltage indicates a difference between a rotational speed of the spindle motor 2 and the reference rotational speed $N_{ref}$, and is supplied to the LPF 12 via the switch 22. As the spindle driver 14 drives the spindle motor 2 in accordance with the voltage which has been integrated by the LPF 12, the rotational speed of the spindle motor 2 is controlled to be equal to the reference rotational speed $N_{ref}$. The optical disk 1 is rotated in accordance with this rotational control on the spindle motor 2.

After the optical disk 1 is rotated in this manner, the system controller 17 starts a search control operation to position the reading point of the pickup 3 to a target track which should actually be accessed for data reading. This search control operation is also executed by a key operation on an unillustrated operation section during the playing operation, or in accordance with a program which indicates the playing order.

Figure 2:
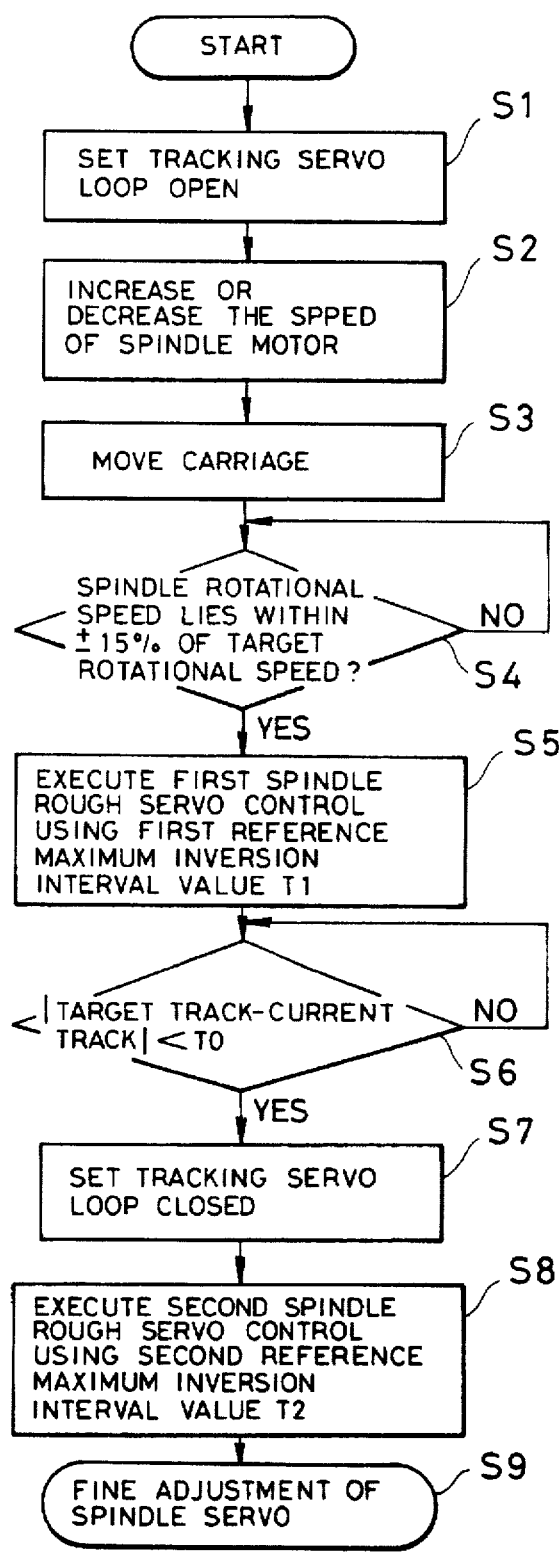
FIG. 2 is a diagram illustrating an operation of a system controller in the apparatus shown in FIG. 1.

In the search control operation, the system controller 17 first generates an instruction to the servo controller 16 to open the tracking servo loop (step S1), as shown in FIG. 2. Then, the system controller 17 instructs the spindle driver 14 to increase or decrease the rotational speed of the spindle motor 2 while the spindle servo loop based on the AC signal of the FG 10 is also set open (step $2). When a current reading position of the pickup 3 is on the inner side of the target track, the rotational speed of the spindle motor 2 is reduced by the spindle driver 14, and when the current reading position of the pickup 3 is on the outer side of the target track, the rotational speed of the spindle motor 2 (spindle rotational speed) is increased by the spindle driver 14. Further, the system controller 17 issues an instruction to drive the carriage motor 19 so as to move the reading position of the pickup 3 to the target track on the optical disk 1 (step S3).

After the execution of step S3, the system controller 17 determines if the spindle rotational speed lies within 15% of the target rotational speed corresponding to the target track (step S4). The spindle rotational speed can be acquired from a counter 20 connected to the output of the FG 10. The counter 20 measures the period of the pulse signal generated from the FG 10 when the spindle motor 2 rotates. The period of the pulse signal from the leading of the pulse signal to the next reading is measured by counting the reference clock from a clock generator (not shown). The system controller 17 sets the reciprocal of the period of the pulse signal as the current spindle rotational speed. The system controller 17 has an internal memory (not shown) where target rotational speeds corresponding to individual tracks (or addresses indicating the tracks) on the optical disk 1 are stored in the form of a data table, so that the system controller 17 searches the data table for the target rotational speed corresponding to the target track. The target rotational speeds corresponding to the individual tracks may be computed from a predetermined equation. Because the system controller 17 can acquire the spindle rotational speed and the target rotational speed in this manner, the system controller 17 can determine if the spindle rotational speed lies within 15% of the target rotational speed.

When the spindle rotational speed falls within 15% of the target rotational speed, the system controller 17 performs a first spindle rough servo control (step S5). In the first spindle rough servo control, the system controller 17 sets the switch 21 to selectively relay the first reference maximum inversion interval value T1 to the comparator 9 and sets the switch 22 to selectively relay an output pulse of the pulse width modulator 25 to the LPF 12. A recorded signal consisting of pit trains on the optical disk 1 is read by the pickup 3, and the read signal is amplified by the RF amplifier 4. The amplified signal is then converted to a binary signal by the binary circuit 5. The output signal of the binary circuit 5 becomes a high level when a pit portion on the optical disk 1 is read, and becomes a low level when a land portion is read. The maximum inversion interval detector 8 detects the maximum inversion interval of the read signal in accordance with the output signal of the binary circuit 5 which shows the mentioned variation. The output maximum inversion interval value detected by the maximum inversion interval detector 8 is compared with the first reference maximum inversion interval value T1 in the comparator 9. A differential output as a comparison result of the comparator 9 is supplied to the system controller 17 and the pulse width modulator 25. The pulse width modulator 25 generates a pulse signal having a width corresponding to the 8-bit differential output every predetermined period. The pulse signal from the pulse width modulator 25 is supplied through the switch 22 to the LPF 12 to be integrated there, and the resultant signal is supplied to the spindle driver 14. The spindle driver 14 therefore drives the spindle motor 2 in such a way that the detected maximum inversion interval value from the maximum inversion interval detector 8 becomes equal to the first reference maximum inversion interval value T1.

After the first spindle rough servo control has started, the system controller 17 determines whether or not the difference between a current track where the reading position by the pickup 3 is currently located and the target track becomes smaller than a predetermined track value $T_0$ (step S6). When the difference between the current track and the target track becomes smaller than the predetermined track value $T_0$, the current track is close to the target track. Thus, the system controller 17 issues an instruction to the servo controller 16 to close the tracking servo loop and start the tracking servo control (step S7). Then, the system controller 17 executes a second spindle rough servo control (step S8). In the second spindle rough servo control, the system controller 17 sets the switch 21 to selectively relay the second reference maximum inversion interval value T2 to the comparator 9 and sets the switch 22 to selectively relay an output pulse of the pulse width modulator 25 to the LPF As a result, the output maximum inversion interval value detected by the maximum inversion interval detector 8 is compared with the second reference maximum inversion interval value T2 in the comparator 9. The pulse width modulator 25 generates a pulse signal having a width corresponding to the comparison result or the differential output every a predetermined period. The pulse signal from the pulse width modulator 25 is supplied through the switch 22 to the LPF 12 to be integrated there, and the resultant signal is supplied to the spindle driver 14. The spindle driver 14 therefore drives the spindle motor 2 in such a way that the detected maximum inversion interval value from the maximum inversion interval detector 8 becomes equal to the second reference maximum inversion interval value T2.

When the second spindle rough servo control sets the output level of the comparator 9 equal to or smaller than a predetermined value (e.g., 0) and the servo control is locked, the control proceeds to a fine adjustment of the spindle servo (step S9). The fine adjustment of the spindle servo is executed in accordance with a clock pulse that is generated by a PLL circuit (not shown) which is connected to the output of the A/D converter 26. This PLL circuit detects a inclined portion in the waveform of a read signal obtained from the A/D converter 26 and generates a clock pulse, which is synchronous in phase with the read signal, on the basis of a value sampled at the inclined portion. The structure and operation of this PLL circuit are disclosed in Japanese Unexamined Patent Publication No. 6-231547. The clock pulse may be generated by extracting a sync signal recorded on the disk 1. This clock pulse is supplied to a phase comparator (not shown). The phase comparator generates an error signal indicative of a phase difference between the clock pulse from the PLL circuit and a reference oscillation pulse, and supplies it to the spindle driver 14.

Although the tracking servo apparatus is assumed to be inactive in the search operation mode in the above-described embodiment, this invention is not limited to such a case. The present invention can be applied to any operation mode of an optical disk player where the tracking servo apparatus becomes inactive.

Although the maximum inversion interval of the read signal is detected in this embodiment, the maximum period of the read signal may be detected and compared with a first or second reference maximum period value.

As described above, according to the spindle servo apparatus for an optical disk player of the present invention, the maximum inversion interval or maximum period that is detected from the read signal acquired from an optical disk by the pickup means is compared with the reference value, and the spindle motor is driven in accordance with the comparison result. When the tracking servo apparatus is inactive, the reference value is set greater than the one set when the tracking servo apparatus is active. It is therefore possible to cope with the case where the maximum inversion interval or maximum period which is detected from the read signal is erroneously determined longer than the actual length. It is therefore possible to properly perform the coarse adjustment of the rotational speed of the spindle motor even when the tracking servo loop is open, thus stabilizing the rotational speed of the disk.

What is claimed is:

1. A spindle servo apparatus for an optical disk player, which reads and reproduces data recorded on an optical disk, for performing coarse adjustment to set a rotational speed of a spindle motor for rotating an optical disk to a specified speed, said apparatus comprising:

pickup means for irradiating a light beam on a recording surface of said optical disk, receiving light reflected therefrom and producing a read signal corresponding to the amount of received light;

means for detecting a maximum inversion interval or a maximum period of said read signal;

reference value generating means for generating a reference value;

comparison means for comparing said maximum inversion interval or maximum period with said reference value; and driving means for driving said spindle motor in accordance with a comparison result by said comparison means, wherein when a tracking servo apparatus is inactive to control an irradiation position of said light beam on said optical disk by said pickup means, said reference value generating means generates said reference value greater than that in a case where said tracking servo apparatus is active.

2. The spindle servo apparatus according to claim 1, wherein in a search control mode where a reading point by said pickup means is controlled to be positioned at a target track on said optical disk, said tracking servo apparatus is inactive and said reference value generating means sets said reference value to a first reference value when the rotational speed of said spindle motor lies within an allowable range of a target rotational speed corresponding to a position of said target track, and when a difference between a current track corresponding to said reading point by said pickup means and said target track becomes smaller than a predetermined track value thereafter, said tracking servo apparatus becomes active and said reference value generating means sets said reference value to a second reference value smaller than said first reference value.

* * * * *